J. A. GRENKE.
LAND MARKER.
APPLICATION FILED MAY 5, 1916.
1,232,288.
Patented July 3, 1917.
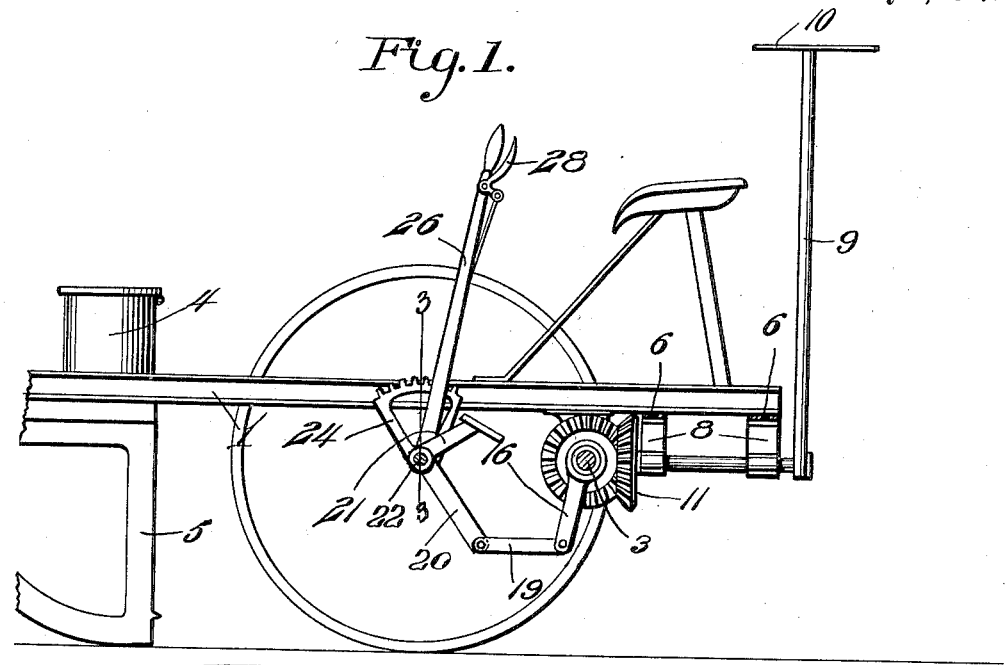
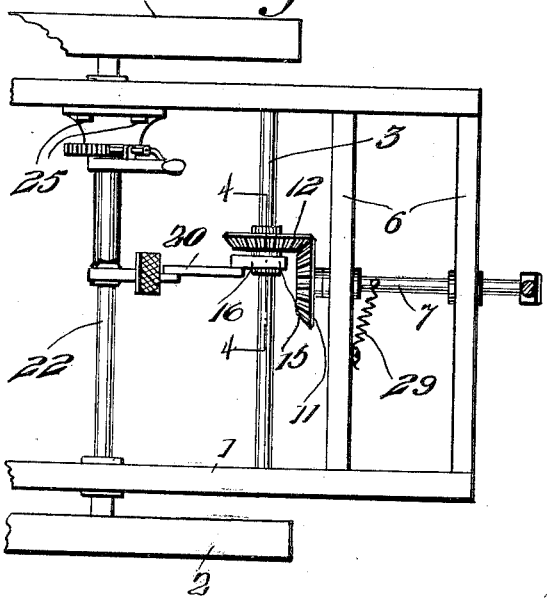
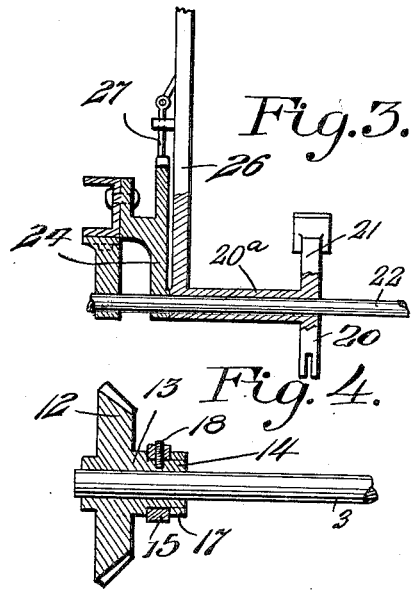
WITNESSES
INVENTOR
Joseph A. Grenke
BY
ATTORNEY

UNITED STATES PATENT OFFICE.

JOSEPH A. GRENKE, OF ROYAL OAK, MICHIGAN.

LAND-MARKER.

1,232,288.   Specification of Letters Patent.   Patented July 3, 1917.

Application filed May 5, 1916. Serial No. 95,693.

*To all whom it may concern:*

Be it known that I, JOSEPH A. GRENKE, a citizen of the United States, residing at Royal Oak, in the county of Oakland and State of Michigan, have invented certain new and useful Improvements in Land-Markers, of which the following is a specification.

This invention has relation to land markers for corn planters or the like, and the nature and objects thereof will be readily apparent to those skilled in the art to which it appertains, in the light of the following explanation of the accompanying drawings illustrating what I now believe to be the preferred embodiment, or mechanical expression, of my invention from among other forms and arrangements within the spirit of the invention and the scope of the appended claim.

However, an object of the invention is to provide a land marking mechanism as an attachment to, or to form a part of a specially constructed corn planter or other agricultural machine of like character, which mechanism is simple in its construction and is adapted to be operated without inconvenience by the foot of the driver, with means for retaining the marker in an inoperative position when desired.

In addition to the foregoing my invention comprehends improvements in the details of construction and arrangement of parts to be hereinafter described and particularly pointed out in the appended claim.

In the accompanying drawings in which similar and corresponding parts are designated by the same characters of reference, throughout the several views in which they appear:—

Figure 1, is a longitudinal section through a corn planter illustrating the application of my invention thereto, Fig. 2, is a view in plan of the rear portion thereof, Fig. 3, is a vertical detail section taken on the line 3—3 of Fig. 1, and Fig. 4, is a detail section taken on the line 4—4 of Fig. 2.

With reference to the drawings the frame of the corn planter designated 1 is supported upon ground wheels 2, which are mounted on the ends of a transverse axle 22. The grain box 4, and planting shoe 5 respectively are of the conventional type. Transverse frame bars 6 disposed in spaced relation are provided at the rear of the frame, and a shaft 7 extending centrally and longitudinally of the frame is mounted in bearings 8 depending from the frame bar 6. A marker arm 9 is secured at one end to the rear end of the shaft 7 which extends slightly beyond the frame for that purpose, and a marking element 10 is mounted upon the outer end of the marker arm. It will thus be obvious that the marker arm is capable of a rotary movement from a vertical to a horizontal or lower position in a direction transversely of the frame.

A bevel gear 11, is mounted for rotation upon the inner end of the shaft 7 and for peripheral engagement with a similar gear 12, loosely mounted upon a shaft 3 extending transversely of the frame. The gear 12 is provided with a central extension 13, slightly reduced at 14 upon which reduced end is engaged the enlarged portion 15, of an arm 16 which is directed forwardly and downwardly. A collar 17 is fitted upon the reduced portion 14, and a set screw 18 is seated in the enlargement 15 and is engaged in a recess in said reduced portion thereby combining to secure the arm 16 for rotation with the gear 12.

A link 19 forms a connection between the free end of the arm 16 and the end of an arm 20, formed on a sleeve 20ᵃ which encircles the shaft 22. A foot lever 21 is also formed integrally with said sleeve. A toothed quadrant 24 is secured to the frame and is provided with an aperture in which the axle 22 is extended. A lever 26 is formed with and extends upwardly from the sleeve 20ᵃ, and is provided with locking mechanism 27 for operation in connection with the quadrant 24.

In operation, the operator when desiring to mark the ground for the purpose of designating the location of seed, or for any other purpose for which land markers are used, depresses the foot lever 21, whereby the sleeve 20ᵃ and the gear 12 are rotated simultaneously and in the same direction, through the medium of the arms 16 and 20, and the link 19. The rotation of the gear 12 is communicated to the gear 11 whereupon the shaft 7 is rotated and the marker arm 9 lowered to a horizontal position. Continued downward movement of the marker arm, brings the marker 10 into engagement with the ground.

Upon releasing the foot pedal, a spring 29 connected to the frame and a pin 30 on the shaft 7 exerts sufficient force to return the marker arm to its normally vertical position and should it be desired to retain the arm 9 in said position the locking mechanism of the lever 26 is placed in engagement with one of the teeth of its correlated quadrant. It is obvious that if desired the marker may be actuated by movement of the lever 26 independently of the foot lever.

While I have illustrated and described my invention with some degree of particularity, various ways of reconstructing the same will occur to those skilled in the mechanical arts, and I therefore reserve the right and privilege of changing the form of the details of construction or otherwise altering the arrangement of the parts without departing from the spirit of the invention, or the scope of the appended claim.

Having thus described my invention what I claim as new and desire to secure by Letters Patent is:—

In a corn planter, the combination with the frame, the axle and the supporting wheels, of a land marker including a marker shaft journaled in the frame, and disposed centrally and longitudinally thereof, a marker arm on the rear end of the shaft, a bevel gear on the forward end thereof, a second shaft journaled in the frame at right angles to the marker shaft and in proximity to the forward end thereof, a bevel gear on said second mentioned shaft for meshing engagement with the first mentioned bevel gear, a spring having connection with the frame and marker shaft to normally retain the marker arm in a vertical position, an arm secured to the second mentioned bevel gear for oscillation therewith, a sleeve on the axle, an arm integrally formed with said sleeve, a link connecting the terminal of said arm with the terminal of the first mentioned arm, a foot pedal formed integrally with said sleeve, a hand lever formed integrally with said sleeve, a segment mounted on the frame and having an apertured portion through which the axle extends, said hand lever being movable in proximity to the segment, and a locking mechanism on the lever for engaging the segment whereby the marker arm can be depressed by oscillation of the foot lever or hand lever, and the arm retained in any adjusted position by the locking mechanism of the lever.

In testimony whereof I affix my signature in presence of two witnesses.

JOSEPH A. GRENKE.

Witnesses:
 ELMER SITERLEY,
 JOHN A. GRENKE.